United States Patent
Shani et al.

(10) Patent No.: US 10,545,775 B2
(45) Date of Patent: Jan. 28, 2020

(54) HOOK FRAMEWORK

(71) Applicant: HEWLETT-PACKARD DEVELOPMENT COMPANY, L.P., Houston, TX (US)

(72) Inventors: Inbar Shani, Yehud (IL); Sigal Maon, Yehud (IL); Amichai Nitsan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 488 days.

(21) Appl. No.: 14/787,380

(22) PCT Filed: Jun. 28, 2013

(86) PCT No.: PCT/US2013/048556
§ 371 (c)(1),
(2) Date: Oct. 27, 2015

(87) PCT Pub. No.: WO2014/209359
PCT Pub. Date: Dec. 31, 2014

(65) Prior Publication Data
US 2016/0092248 A1    Mar. 31, 2016

(51) Int. Cl.
*G06F 9/455*    (2018.01)

(52) U.S. Cl.
CPC ........ *G06F 9/4552* (2013.01); *G06F 9/45529* (2013.01); *G06F 9/45545* (2013.01)

(58) Field of Classification Search
None
See application file for complete search history.

(56) References Cited

U.S. PATENT DOCUMENTS

| | | |
|---|---|---|
| 2004/0237071 A1 | 11/2004 | Hollander et al. |
| 2007/0234295 A1 | 10/2007 | Dufour et al. |
| 2008/0270199 A1* | 10/2008 | Chess ............... G06F 9/505 705/7.26 |
| 2009/0089809 A1 | 4/2009 | Deshpande et al. |
| 2009/0204980 A1 | 8/2009 | Sandoval et al. |
| 2011/0145919 A1 | 6/2011 | Whelihan et al. |

(Continued)

FOREIGN PATENT DOCUMENTS

| | | |
|---|---|---|
| CN | 101151617 | 3/2008 |
| CN | 101266563 | 9/2008 |

(Continued)

OTHER PUBLICATIONS

[MOD] Fugu Tweaks; http://forum.xda-developers.com/showthread.php?t=981125 > ; Mar. 5, 2011.

(Continued)

*Primary Examiner* — Sisley N Kim

(57) ABSTRACT

An application process can be executed based on an initialization instruction, where the application process includes instructions associated with a hook framework. A virtual machine configured to load the hook framework on the virtual machine based on instructions included in the application process can be initiated and the instructions associated with the hook framework can be executed upon initiation of the virtual machine to insert a hook on the virtual machine. A nascent process configured to initiate an additional virtual machine can be initiated based on a request to load an application, where the additional virtual machine is hooked via the hook inserted on the virtual machine.

17 Claims, 5 Drawing Sheets

(56) References Cited

U.S. PATENT DOCUMENTS

| | | | |
|---|---|---|---|
| 2012/0089980 A1* | 4/2012 | Sharp | G06F 9/45558 |
| | | | 718/1 |
| 2013/0036470 A1* | 2/2013 | Zhu | H04L 63/0227 |
| | | | 726/23 |
| 2013/0155083 A1* | 6/2013 | McKenzie | G06T 1/20 |
| | | | 345/522 |

FOREIGN PATENT DOCUMENTS

| | | |
|---|---|---|
| CN | 102150105 | 8/2011 |
| WO | WO-0068790 A1 | 11/2000 |

OTHER PUBLICATIONS

How to run a Dalvik executable with GDB on Android?; http://stackoverflow.com/questions/5906027/how-to-run-a-dalvik-executable-with-gdb-on-android.

International Search Report & Written Opinion, Mar. 31, 2014, PCT Patent Application No. PCT/US2013/048556, 10 pages.

W8 Walkman Ginger Ultimate V1 (active Launcher) and V2; http://www.howtomakeonline.org/ISLbkMoneyn_Rd92/W8-Walkman-Ginger-Ultimate-V1-(Active-Launcher)-and-V2.html >; Copyright© HowToMakeOnline.org.

Extended European Search Report received in EP Application No. 13887657.8, dated Dec. 7, 2016, 8 pages.

Ivanov, I., "API Hooking Revealed," (Web Page), Apr. 6, 2002, 18 pages, available at http://www.rdsquared.net/2009/08/12/CodeProject_API_Hooking_Revealed.pdf.

Payne, B. D. et al., "Lares: An Architecture for Secure Active Monitoring Using Virtualization," (Research Paper), 2008 IEEE Symposium on Security and Privacy, 15 pages, available at http://www.cs.ubc.ca/nest/dsg/Sem_Summer_2008/oakland08.pdf.

\* cited by examiner

HOOK FRAMEWORK

CROSS-REFERENCE TO RELATED APPLICATION

This application is a U.S. National Stage Application of and claims priority to International Patent Application No. PCT/US2013/048556, filed on Jun. 28, 2013, and entitled "HOOK FRAMEWORK".

BACKGROUND

Applications can be a set of executable instructions that can cause a computing device to perform a particular function. Computing devices can include mobile phones (e.g., smart phones), which can have a variety of operating systems (OS)s (e.g., mobile OSs), which can run a variety of applications. For instance, applications can include a gaming application, a navigation application, a camera application, etc. Applications can be developed for each respective OS.

DETAILED DESCRIPTION

Figure 1:
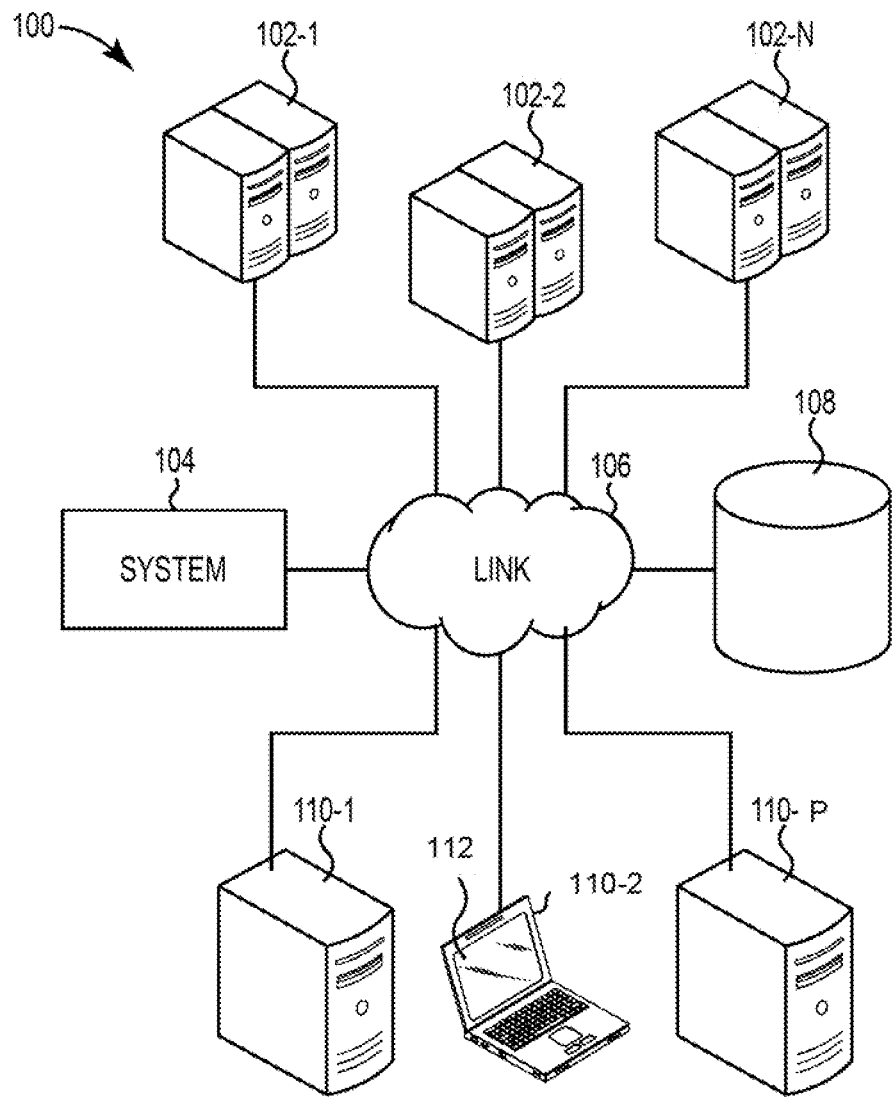
FIG. 1 illustrates an example of an environment for implementing a hook framework according to the present disclosure.

Mobile application (e.g., application configured for a mobile device) development is a growing practice spurred by a growing number of mobile devices and capabilities associated with those devices. Due, in part, to an increase in capabilities associated with mobile devices, applications have become increasingly sophisticated, relying on device features and/or embedding client side logic (e.g., JavaScript). To support the development of such applications, it can be beneficial to provide development tools that can integrate with a particular operating system (OS) associated with the mobile device. For example, it can be beneficial to integrate with the particular OS in a low-level interface, enabling use of application development tools, such as testing tools, recording tools, monitoring tools, etc. Such low level OS interaction can also be used in consumer application software and/or enterprise application software to achieve objectives such as securing a device according to enterprise policies, for example.

Some previous methods allow for low level OS interaction through hooking. Hooking can include altering a behavior of an application and/or collecting data associated with the application by intercepting data passed between software components. For instance, hooking can refer to various techniques to monitor, alter, and/or otherwise gain control of an application. For example, function calls, messages, and/or network traffic passed to and/or from an application can be intercepted and/or copied by hooking. Hooking an application can include injecting a library including an executable hooking instruction into the application prior to the application executing and/or injecting an executable hooking instruction into the application during runtime of an OS and/or during execution of functions of the application, for example. These previous methods can be used for an OS that implements a virtual machine. For example, methods can be used for a Linux OS and/or for a Java based OS, which implements a Java Virtual Machine (JVM) (e.g., a machine that can execute Java byte-code).

However, some mobile OSs, such as the Android OS, cannot be hooked using the previous methods for Linux and/or Java based OSs. For instance, some mobile OSs do not include an application programming interface for hooking, and since the startup sequences of such mobile OSs do not allow for changes in read only memories (ROM)s, previous methods used for hooking with the Linux OS do not work.

In addition, some mobile OSs may not be hooked using previous methods for the Java based OS. In an example, the JVM can be hooked using class loaders. However, other mobile OSs (e.g., Android OS) and their associated virtual machines (e.g., Android Dalvik virtual machine (DVM)) do not support use of class loaders, and thus cannot be hooked using this method.

In addition, other previous methods can prove insufficient for hooking some mobile OSs. For example, previous methods can simulate a driver layer. However, in some mobile OSs, drivers are ROM dependent and cannot be replaced without replacing an entire kernel of the ROM, making this method impractical. Other previous methods change a wrapper library layer. However, this may not be practical on some mobile OSs, where library files (e.g., ".so" files) are prelinked on ROM compilation. As such, original libraries may not be loaded.

For example, previous methods can modify "jar" files. "jar" files can be defined as an archive file format used to aggregate Java ".class" files and/or associated metadata into one file to distribute application software and/or libraries on the Java based OS. Modifying the ".jar" file can involve extracting the ".jar" file, manually editing ".smali" files (e.g., Android's equivalent to byte-code ".class" files), and reloading the modified "jar" file. However, this method can be complicated, hard to maintain, and can entail handling byte-code. In addition, this method may not support modifying methods using JNI, which is a programming framework that can enable Java instructions running in a JVM to call and/or be called by native applications and libraries written in other languages such as C, C++, and/or assembly.

In contrast, examples of the present disclosure can include modifying an application process that is responsible for initiating a virtual machine (e.g., DVM), pre-loading system classes that are used by applications, and/or initiating other processes. Examples of the present disclosure can modify the application process to include a hook framework, which can be executed upon initiation of the virtual machine and can insert a hook on the virtual machine to access data associated with an application via the hook.

FIG. 1 illustrates an example of an environment for implementing a hook framework according to the present disclosure. The environment 100 is shown to include a system 104 to implement a hook framework, mobile devices 102-1, 102-2, . . . , 102-N, user devices 110-1, 110-2, . . . , 110-P, a data store 108, and a link 106. The data store 108 can be analogous to those discussed with respect to FIG. 3A. The system 104 can include a computing device analogous to that discussed with respect to FIG. 3B. The mobile devices 102-1, . . . , 102-N, as described herein, can be a computing device (e.g., an electronic device).

The user devices 110-1, . . . , 110-P can represent computing devices configured to access data (e.g., electronic data) associated with an application that has been loaded and/or will be loaded within a defined time on the mobile devices 102-1, . . . , 102-N to communicate such data, and/or alter the application by executing an instruction. The user devices 110-1, . . . , 110-P can include a digital display such as a graphical user interface (GUI) 112. Similarly, in some examples, the mobile devices 102-1, . . . , 102-N can include a digital display (not shown) suitable for display of electronic data.

A user interface can include hardware components and/or computer-readable instruction components. For instance, hardware components can include input components (e.g., a mouse, a touch screen, and a keyboard) and/or output components (e.g., a display). An example user interface can include a GUI 112. A GUI 112 can, for example, digitally represent data associated with an application that is collected via a hook. That is, in some examples, an electronic representation can be displayed by a user interface of user devices 110-1, . . . , 110-P. Such displays can facilitate interactions between a user and a computer (e.g., allows a user to interact with a computer using images and/or text).

Link 106 (e.g., a network) represents a cable, wireless, fiber optic, or remote connection via a telecommunication link, an infrared link, a radio frequency link, and/or other connectors or systems that provide electronic communication. That is, the link 106 can, for example, include a link to an intranet, the Internet, or a combination of both, among other communication interfaces. The link 106 can also include intermediate proxies, for example, an intermediate proxy server (not shown), routers, switches, load balancers, and the like.

The system 104 for implementing a hook framework, as described herein, can represent different combinations of hardware and instructions to implement a hook framework. The system 104 for implementing the hook framework can include a computing device, for instance, computing device 348 as discussed in relation to FIG. 3B.

Figure 2A:
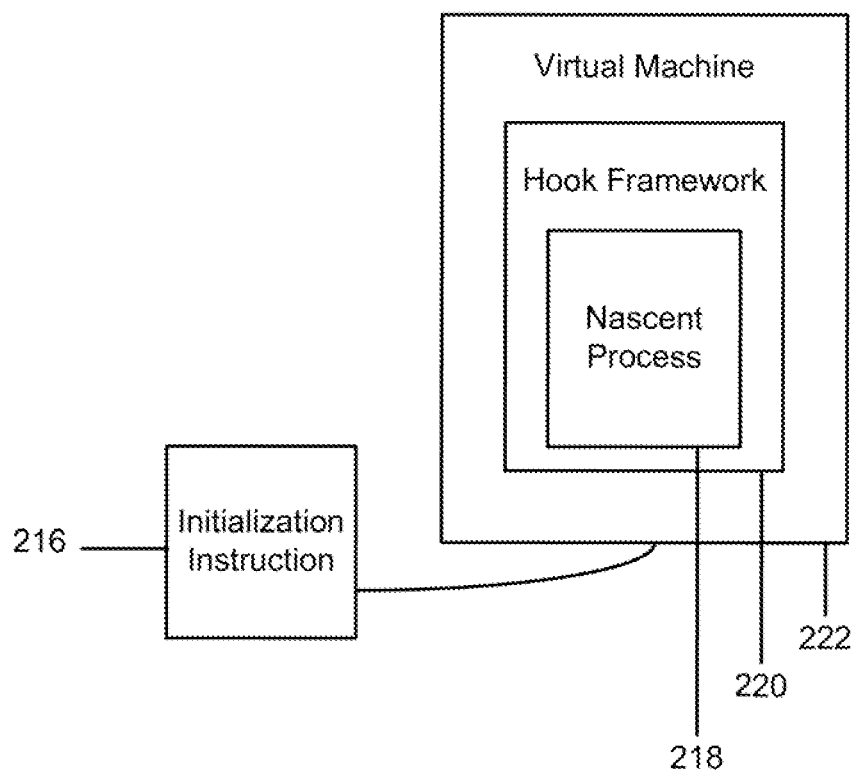
FIG. 2A illustrates an example of a flowchart for implementing a hook framework according to the present disclosure.

FIG. 2A illustrates an example of a flowchart for implementing a hook framework according to the present disclosure. For example, the flowchart can be illustrative of a startup of a mobile device, such as a mobile device that includes a mobile OS. Upon startup of the mobile device, an initialization instruction 216 can be interpreted. The initialization instruction 216 can be a first process started during startup of the mobile device and can be responsible for providing instructions for initiating a virtual machine 222 and a nascent process 218, as discussed herein.

In a normal (e.g., unmodified) startup of the mobile OS, the initialization instruction 216 can initiate the nascent process 218 and the virtual machine 222. The nascent process 218 can be defined as a beginning process. For instance, the nascent process 218 can be a first process that is initiated in the startup of the mobile OS. In some examples, the nascent process 218 can be responsible for pre-loading system classes that can be used by applications that are run on the mobile device. For example, the nascent process 218 can be responsible for starting processes associated with the applications. The nascent process 218 can be run on the virtual machine 222. In some examples, the nascent process 218 can be configured to load an application. For example, one or more instances of the virtual machine 222 can be initiated by the nascent process 218 and the nascent process 218 can run the application on the virtual machine 222.

In some examples, for each application that is loaded, an instance of the virtual machine 222 can be initiated. For instance, the nascent process 218 can duplicate the virtual machine 222 to run the application on the duplicated virtual machine. The virtual machine 222 can access application software (e.g., system libraries) containing instructions for the applications that are run on the virtual machine 222.

The initialization instruction 216 can be modified and/or replaced to include instructions associated with a hook framework. The instructions associated with the hook framework can be executed upon initiation of the virtual machine 222 to form the hook framework 220. For example, the nascent process 218 can initiate an additional virtual machine based on a request to load an application, as discussed herein. In some examples of the present disclosure, the additional virtual machine can be hooked via the hook inserted on the virtual machine 222. As such, the hook can be utilized to monitor, alter, and/or otherwise gain control of applications that are run on the additional virtual machine.

The applications run on the additional virtual machine can access sensor data associated with sensor services. For instance, an application associated with a power management service can access data associated with a power manager sensor (e.g., voltage sensor) included in the sensor services. As such, the hook inserted on the virtual machine 222 can collect the data that is passed from the power manager sensor included in the sensor services to the application that is run on the additional virtual machine. In some examples, the collected data can be used to ensure that an application is processing the data as intended and/or debug an application that is not processing the data correctly. Alternatively, the data can be modified before being passed to the applications.

Figure 2B:
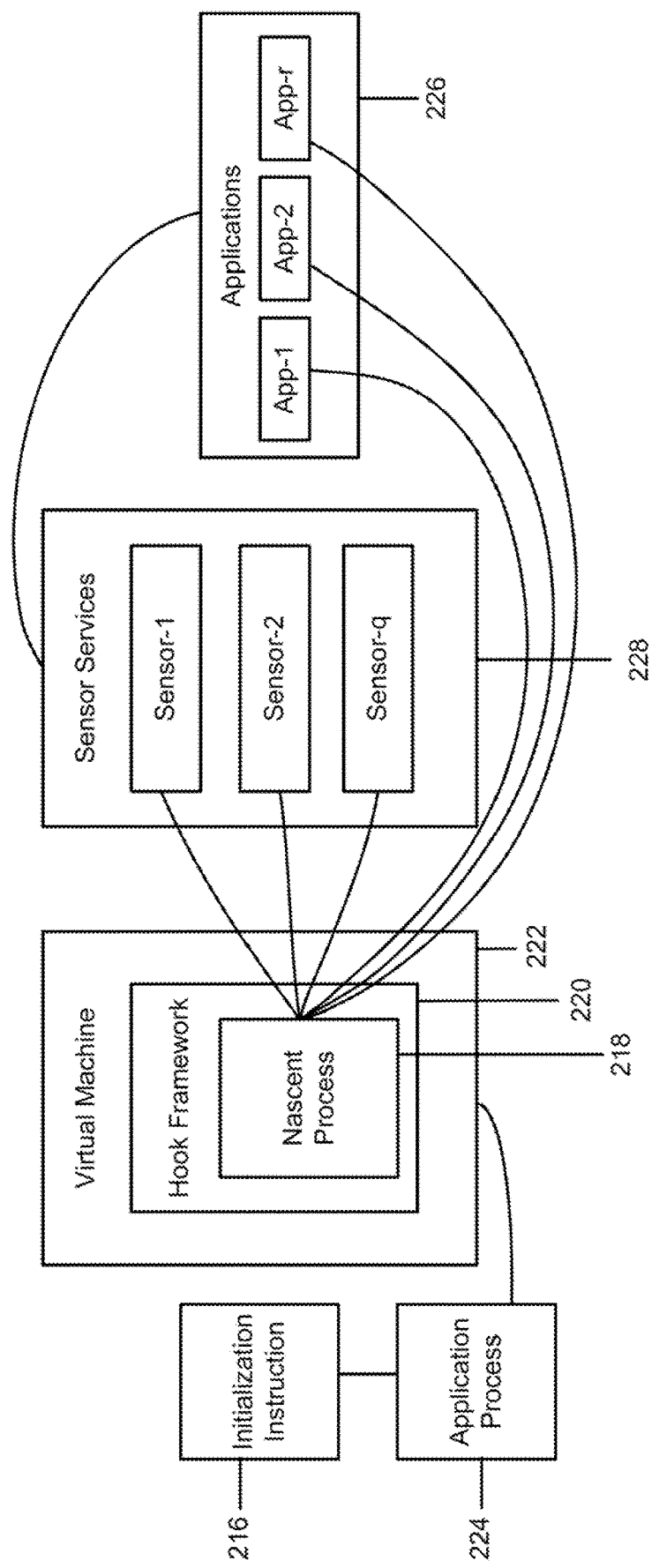
FIG. 2B illustrates an example of a flowchart for implementing a hook framework for a particular operating system according to the present disclosure.

FIG. 2B illustrates an example of a flowchart for implementing a hook framework for a particular OS according to the present disclosure. For example, the flowchart can be illustrative of a startup of a mobile device, such as a mobile device that includes the particular mobile OS, such as an Android OS. Upon startup of the mobile device, an initialization instruction 216 can be interpreted, which can be referenced as "init.rc" in the Android OS. The initialization instruction 216 can be a first process started during startup of the mobile device and can be responsible for providing instructions for executing an application process 224. In an example, the application process 224 can be a main process responsible for initiating a virtual machine 222 and a nascent process 218, as discussed herein.

In a normal (e.g., unmodified) startup of the mobile OS, the application process 224, which can be referenced as "app_process" in the Android OS, can initiate the nascent process 218 and the virtual machine 222. The nascent process 218 can be responsible for pre-loading system classes that can be used by applications 226 (e.g., App-1, App-2, App-r) that are run on the mobile device. For example, the nascent process 218 can be referenced in the Android OS as "Zygote" and can be responsible for starting processes associated with applications 226 and/or sensor services 228 associated with the applications 226. The nascent process 218 can be run on the virtual machine 222, which can be referenced as a DVM in the Android OS.

The nascent process 218 can be configured to load an application, in which case, the nascent process 218 is configured to initiate an additional virtual machine based on a request to load an application. The additional virtual machine can be a duplicate of the virtual machine 222. For example, one or more instances of the virtual machine 222 can be initiated by the nascent process 218. In some examples, for each application that is loaded, an additional instance of the virtual machine 222 can be initiated by the nascent process 218.

The additional virtual machine can access application software (e.g., system libraries) containing instructions for the applications 226 that are loaded by the additional machine. As such, instructions associated with the applications 226 that are loaded by the virtual machine can be executed by the virtual machine.

The application process 224 can be modified and/or replaced to include instructions associated with a hook framework 220. The instructions associated with the hook framework 220 can be executed upon initiation of the virtual machine 222 to form the hook framework 220. For example, the instructions associated with the hook framework 220 can be executed upon initiation of the virtual machine 222 to insert a hook on the virtual machine 222.

The nascent process 218 can initiate an additional virtual machine based on a request to load an application, as discussed herein. In some examples of the present disclosure, the additional virtual machine can be hooked via the hook inserted on the virtual machine 222. As such, the hook can be utilized to monitor, alter, and/or otherwise gain control of applications 226 loaded by the additional virtual machine.

The applications 226 can access sensor data associated with the sensor services 228. For instance, an application associated with a power management service can access data associated with a power manager sensor (e.g., voltage sensor) included in the sensor services 228. As such, the hook inserted on the virtual machine 222 can collect the data that is passed from the power manager sensor included in the sensor services 228 to the applications 226.

In some examples, sensor services 228 can include a network connectivity sensor (e.g., WiFi sensor associated with a WiFi service, a Bluetooth sensor associated with Bluetooth service), an electrical sensor (e.g., current sensor) associated with a power manager service, etc. In some examples, sensor services 228 can include an accelerometer sensor, power sensor, global positioning system (GPS) sensor, gyroscopic sensor, etc.

In some examples, the collected data can be used to ensure that an application is processing the data as intended and/or debug an application that is not processing the data correctly. Alternatively, the data can be modified before being passed to the applications 226.

Figure 3A:
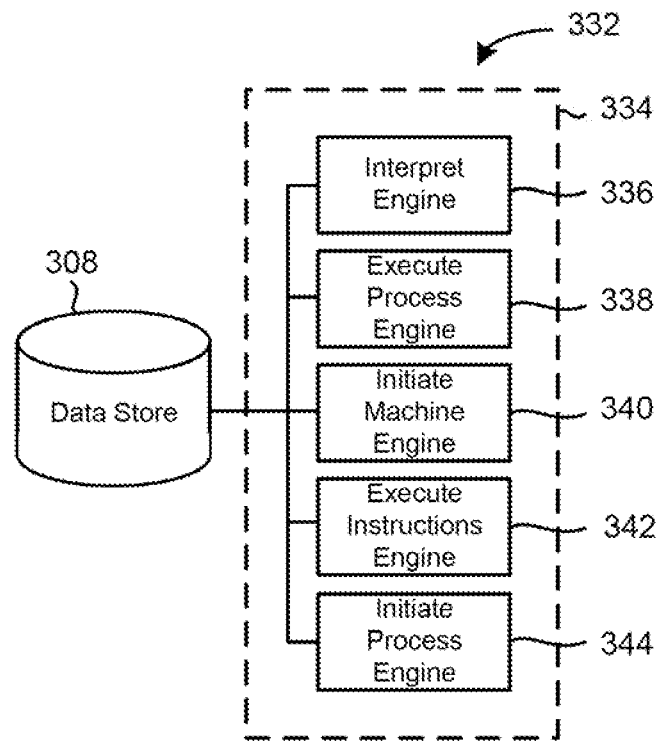
FIG. 3A illustrates a diagram of an example of a system for implementing a hook framework according to the present disclosure.

FIG. 3A illustrates a diagram of an example of a system 332 for implementing a hook framework according to the present disclosure. The system 332 can include a data store 308 (e.g., analogous to data store 108 as discussed in relation to FIG. 1), an implementing system 334, and/or a number of engines. The implementing system 334 can be in communication with the data store 308. In some examples, the implementing system 334 can include a number of engines (e.g., interpret engine 336, execute process engine 338, initiate machine engine 340, execute instructions engine 342, initiate process engine 344, etc.). The implementing system 334 can include additional or fewer engines than illustrated to perform the various functions.

The interpret engine 334 can include hardware and/or a combination of hardware and programming to interpret an initialization instruction. In an example, the initialization instruction can provide instructions for execution of an application process.

The execute process engine 338 can include hardware and/or a combination of hardware and programming to execute the application process based on the initialization instruction. In some examples, the application process can include instructions associated with a hook framework. The hook framework can include instructions to insert hooks.

The initiate machine engine 340 can include hardware and/or a combination of hardware and programming to initiate a virtual machine configured to load the hook framework based on instructions included in the application process. For example, in the Android OS, the virtual machine is referenced as a DVM, which is an implementation of a NM, and is designed to run on mobile devices that use the Android OS. The hook framework can include instructions that can be executed to insert a hook.

The execute instructions engine 342 can include hardware and/or a combination of hardware and programming to execute the instructions associated with the hook framework upon initiation of the virtual machine to insert a hook from the hook framework on the virtual machine. As discussed herein, as an application is loaded, the virtual machine can be duplicated to initiate an additional virtual machine that can run the application. As such, the hook that is inserted on the virtual machine can collect data associated with the application that is run on the additional virtual machine. Alternatively, since the virtual machine is duplicated to create the additional virtual machine, the additional virtual machine can also include a hook, which can collect data associated with the application that is run on the additional virtual machine.

The initiate process engine 344 can include hardware and/or a combination of hardware and programming to initiate a nascent process configured to initiate the additional virtual machine based on a request to load an application. For example, the virtual machine can run the nascent process and the additional virtual machine can run the application. As such, data that is requested by applications from software components (e.g., application software) and/or a sensor can be accessed by the hook on the virtual machine and/or the hook that is on the additional virtual machine.

In some examples, the hook framework can be executed after the virtual machine is initiated and before the nascent process is initiated. As such, the hook framework can access the data associated with the application that is passed from application software and/or a sensor to the application executed on the additional virtual machine.

In some examples, upon startup of a navigation application, the application can access application software, which can be executed on the additional virtual machine to load the navigation application and/or perform a function associated with the navigation application. In addition, the navigation application can access sensor data associated with a GPS sensor, which can be passed to the additional virtual machine. The navigation application can use the sensor data to determine a location of a mobile device on which the navigation application is loaded, for example. Further, the navigation application can access sensor data associated with a WiFi sensor to download a map, directions to a destination, and/or data associated with traffic, which can also be passed to the additional virtual machine. As such, the application software, sensor data associated with the GPS sensor, and sensor data associated with the WiFi sensor can all be passed to the additional virtual machine.

As discussed herein, because the hook is placed between the nascent process and the virtual machine, the hook can be provided with access to the data associated with the application that is passed from the application software and/or a sensor to the application executed on the additional virtual machine. In an example, the hook can be configured to collect the data associated with the application that is passed from the application software and/or sensor to the application executed on the additional virtual machine. For instance, the hook can include instructions, which can be injected into the OS associated with the mobile device to enable application recording, application hijacking, application interruption, application monitoring, etc. of the application with the hook.

In an example, a library function call made by the application associated with a sensor can be intercepted to record data that the sensor sends to and/or receives from the application. Recording refers to storing data. The recorded data can be stored along with information (e.g., metadata) associated therewith. Such information can include a time of generation of the sensory data, an identification of the application associated with the sensor data, an application function that prompted the sensor data to be generated, and/or an identification of the sensor that captured that data, etc. Such information can be stored in a data store (e.g., data store 108 as discussed in relation to FIG. 1). Such hooking can be useful for a developer of an application who wishes to debug the application (e.g., an application in a live environment).

In an example, since the hook provides access to the data that is passed to and/or from the application, application hijacking can be performed. Application hijacking can include taking control of the application. In an example, the application can perform functions based on application software that can be obtained from system libraries. Application hijacking can include bypassing the system library via the hook and passing instructions to the application to prompt the application to perform a particular function, for example.

In an example, application interruption can be defined as issuing an instruction to interrupt an operation associated with the application. Application interruption can be performed by issuing instructions via the hook to interrupt the operation associated with the application. For instance, a running application can be stopped, which can allow for an analysis and/or debugging of the application.

In some examples, application monitoring can include providing details associated with the operation of the application via the hook. For instance, details associated with central processing unit (CPU) utilization, memory demands, data throughput, and/or bandwidth associated with the application can be monitored via the hook. Details associated with the operation of the application can be accessed and monitored via user devices, as discussed in relation to FIG. 1.

Data associated with the application that has been loaded can be collected. For instance, data associated with applications that are currently running can be collected. Alternatively, data associated with an application that will be loaded within a defined time can be collected via the hook. For instance, data associated with applications that are not currently running but will run in the future can be collected.

An application can be loaded on its own instance of the virtual machine. As such, based on a request to load an additional application, an additional virtual machine can be initiated and the additional virtual machine can be hooked via the hook to collect data associated with the application. As discussed herein, the virtual machine can be duplicated by the nascent process to create the additional virtual machine. By duplicating the virtual machine with the nascent process to create the additional virtual machine, the additional virtual machine is hooked because the hook has already been inserted into the virtual machine and can access data passing through the nascent process to the additional virtual machine. This can enable recording, hijacking, interruption, monitoring, etc. of the data associated with the application.

Figure 3B:
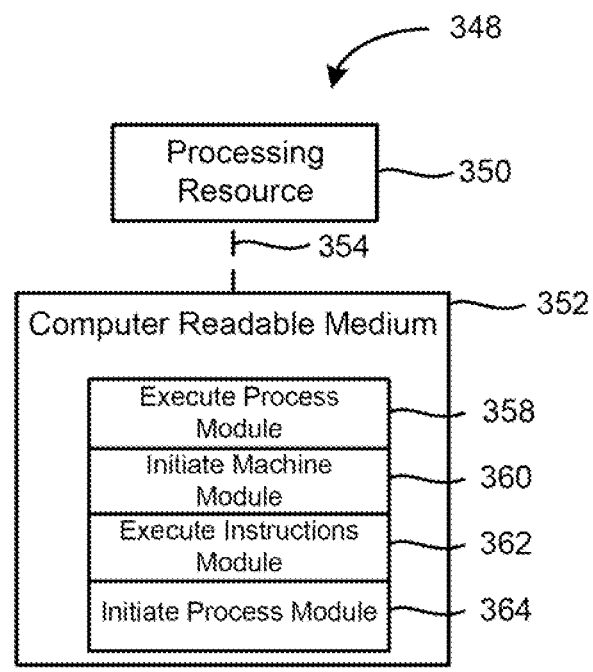
FIG. 3B illustrates a diagram of an example of a computing device for implementing a hook framework according to the present disclosure.

FIG. 3B illustrates a diagram of an example of a computing device for implementing a hook framework according to the present disclosure. The computing device 348 can utilize software, hardware, firmware, and/or logic to perform a number of functions described herein.

The computing device 348 can be a combination of hardware and instructions to share information. The hardware, for example can include a processing resource 350 and/or a memory resource 352 (e.g., computer-readable medium (CRM), database, etc.). A processing resource 350, as used herein, can include a number of processors capable of executing instructions stored by a memory resource 352. Processing resource 350 can be integrated in a single device or distributed across multiple devices. The instructions (e.g., computer-readable instructions (CRI)) can include instructions stored on the memory resource 352 and executable by the processing resource 350 to implement a particular function (e.g., implement a hooking framework, etc.).

The memory resource 352 can be in communication with the processing resource 350. A memory resource 352, as used herein, can include a number of memory components capable of storing instructions that can be executed by processing resource 350. Such a memory resource 352 can be a non-transitory CRM. The memory resource 352 can be integrated in a single device or distributed across multiple devices. Further, the memory resource 352 can be fully or partially integrated in the same device as the processing resource 350 or it can be separate but accessible to that device and the processing resource 350. Thus, it is noted that the computing device 348 can be implemented on a user device and/or a collection of user devices, on a mobile device and/or a collection of mobile devices, and/or on a combination of the user devices and the mobile devices.

The memory resource 352 can be in communication with the processing resource 350 via a communication link 354 (e.g., path). The communication link 354 can be local or remote to a computing device associated with the processing resource 350. Examples of a local communication link 354 can include an electronic bus internal to a computing device where the memory resource 352 is one of a volatile, non-volatile, fixed, and/or removable storage medium in communication with the processing resource 350 via the electronic bus.

The memory resource 352 can include a number of modules such as an execute process module 358, an initiate machine module 360, an execute instructions module 362, and an initiate process module 364. The number of modules 358, 360, 362, 364 can include CRI that when executed by the processing resource 350 can perform a number of functions. The number of modules 358, 360, 362, 364 can be sub-modules of other modules. For example, the execute process module 358 and the initiate machine module 360 can be sub-modules and/or contained within the same computing device. In another example, the number of modules 358, 360, 362, 364 can comprise individual modules at separate and distinct locations (e.g., CRM, etc.).

Each of the number of modules 358, 360, 362, 364 can include instructions that when executed by the processing resource 350 can function as a corresponding engine as described herein. In another example, the initiate process module 364 can include instructions that when executed by the processing resource 350 can function as the initiate process engine 344. For instance, the initiate process module 364 can include CRI that when executed by the processing resource 350 can automatically cause the user device to initiate a nascent process configured to initiate an additional virtual machine based on a request to load an application.

Figure 4:
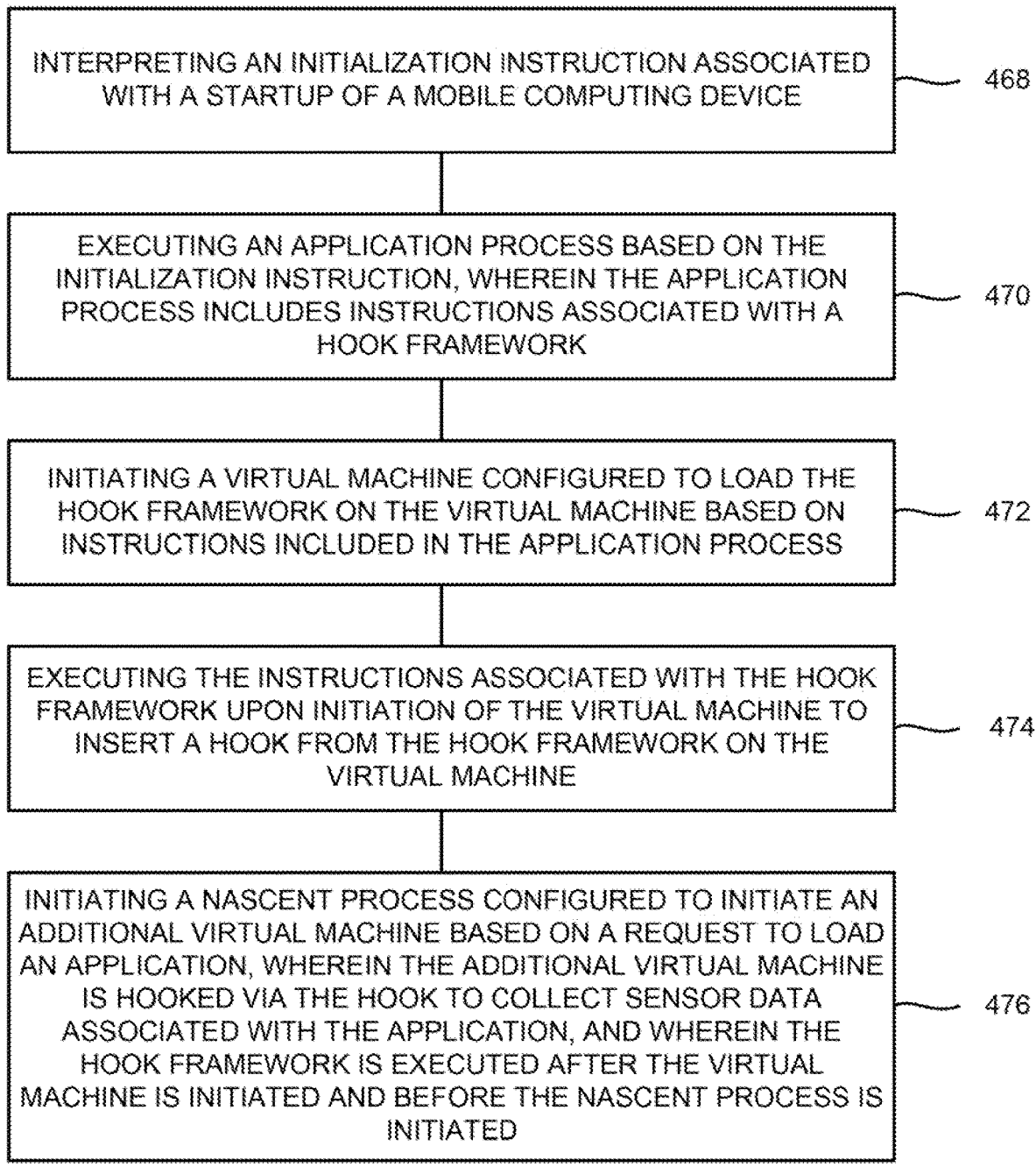
FIG. 4 illustrates a flow diagram of an example of a method for implementing a hook framework according to the present disclosure.

FIG. 4 illustrates a flow diagram of an example of a method for implementing a hook framework according to the present disclosure. The method can include interpreting 468 an initialization instruction associated with a startup of a mobile device, as discussed herein. The method can include executing 470 an application process based on the initialization instruction. For example, the application process can include instructions associated with a hook framework. For instance, the instructions associated with the hook framework can include instructions associated with inserting a hook, as discussed herein.

The method can include initiating 472 a virtual machine configured to load the hook framework on the virtual machine based on instructions included in the application process. In some examples, the virtual machine can be configured to execute instructions associated with the hook framework to load the hook framework on the virtual machine.

The method can include executing 474 the instructions associated with the hook framework upon initiation of the virtual machine to insert a hook from the hook framework on the virtual machine. The method can include initiating 476 a nascent process configured to initiate an additional virtual machine based on a request to load an application. The additional virtual machine can be hooked via the hook to collect sensor data associated with the application. For example, the hook can collect sensor data associated with the application. The sensor data can include data associated with sensors such as a GPS sensor and/or a gyroscopic sensor, for example.

The nascent process can be responsible for pre-loading system classes that can be used by applications that are run on the mobile device. For example, the nascent process can initiate an additional virtual machine based on a request to load an application. For instance, an additional virtual machine can be initiated by the nascent process for each additional application that is loaded. The additional virtual machine can be a duplicate of the virtual machine and can therefore also be hooked, providing access to data associated with the application that is run on the additional virtual machine.

The method can include replacing instructions associated with the application via the hook. The hook can be placed on the virtual machine, creating an access point between the virtual machine and the nascent process through which application software (e.g., instructions can be passed). As such, instructions that are passed through the nascent process to the additional virtual machine for execution by the additional virtual machine can be intercepted, altered, and/or replaced via the hook. The altered and/or replaced instructions can then be executed by the virtual machine running the application to alter a behavior of the application, for example.

In some examples, the instructions associated with the hook framework can be executed after the virtual machine is initiated and before the nascent process is initiated. By executing the instructions in this order, the hook framework can be installed between the nascent process and the virtual machine. As such, the hook framework can intercept data associated with application software and/or a sensor that is passed to and/or from the application that is run on the additional virtual machine.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 308 in FIG. 3.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method comprising:
   interpreting an initialization instruction associated with a startup of a mobile device;
   executing an application process based on the initialization instruction, wherein the application process includes instructions associated with a hook framework;
   initiating a virtual machine by the application process;
   executing the instructions associated with the hook framework upon initiation of the virtual machine to insert a hook from the hook framework on the virtual machine;
   initiating a nascent process in the virtual machine, the nascent process to initiate an additional instance of the virtual machine in response to a request to load an application, wherein the additional instance of the virtual machine is created by duplicating the virtual machine on which the hook has been inserted; and
   collect sensor data associated with the application using the hook.

2. The method of claim 1, further comprising replacing instructions associated with the application via the hook, and executing the replaced instructions.

3. The method of claim 1, further comprising passing the collected sensor data to the application run in the additional instance of the virtual machine.

4. The method of claim 1, wherein collecting the sensor data associated with the application comprises collecting data from a network connectivity sensor.

5. A non-transitory computer readable medium storing machine-readable instructions executable by a processing resource to:
   execute an application process based on an initialization instruction, wherein the application process includes instructions associated with a hook framework;
   initiate a virtual machine by the application process;

execute the instructions associated with the hook framework upon initiation of the virtual machine to insert a hook on the virtual machine;

initiate a nascent process configured to initiate an additional instance of the virtual machine based on a request to load an application, wherein the additional instance of the virtual machine is hooked via the hook inserted on the virtual machine, wherein the additional instance of the virtual machine is created by duplicating the virtual machine on which the hook has been inserted; and collect, by the hook, data from a service, and pass the collected data to the application running in the additional instance of the virtual machine.

6. The non-transitory computer readable medium of claim 5, wherein the machine-readable instructions are executable to cause the hook to collect data associated with an application that will be loaded within a defined time.

7. The non-transitory computer readable medium of claim 5, wherein the machine-readable instructions are executable to intercept a library function call made by the application.

8. The non-transitory computer readable medium of claim 5, wherein the instructions associated with the hook framework are executable after the virtual machine is initiated and before the nascent process is initiated.

9. The non-transitory computer readable medium of claim 8, wherein additional instances of the virtual machine that are loaded based on additional requests to load applications are hooked via the hook inserted on the virtual machine.

10. The non-transitory computer readable medium of claim 5, wherein the machine-readable instructions are executable to monitor at least one of central processing unit utilization, memory demands, data throughput, or bandwidth associated with the application via the hook.

11. The non-transitory computer readable medium of claim 5, wherein instructions are executable to perform application interruption via the hook.

12. The non-transitory computer readable medium of claim 5, wherein the nascent process is initiated in the virtual machine.

13. The non-transitory computer readable medium of claim 5, wherein the collecting of the data from the service comprises collecting the data from a sensor associated with the application.

14. The non-transitory computer readable medium of claim 5, wherein the instructions are executable on the processing resource to pass, using the hook, instructions to the application run in the additional instance of the virtual machine to cause the application to perform a specified function.

15. A system comprising:
a processor; and
a non-transitory computer readable medium having machine-readable instructions executable on the processor to:
execute an application process based on an initialization instruction, wherein the application process includes instructions associated with a hook framework;
initiate a virtual machine configured to load the hook framework;
execute the instructions associated with the hook framework upon initiation of the virtual machine to insert a hook from the hook framework on the virtual machine;
initiate a nascent process configured to initiate an additional instance of the virtual machine in response to a request to load an application, wherein the additional instance of the virtual machine is hooked via the hook, wherein the additional instance of the virtual machine is created by duplicating the virtual machine on which the hook has been inserted; and
collect, using the hook, data from a service, and pass the collected data to the application running in the additional instance of the virtual machine.

16. The system of claim 15, wherein the hook is configured to perform application recording.

17. The system of claim 15, wherein the hook is configured to collect the data from a sensor associated with the application.

* * * * *